Dec. 3, 1968  E. S. DRIVER ET AL  3,414,875
PROCESSING OF SEISMIC DATA
Filed March 10, 1967

INVENTORS.
EDGAR S. DRIVER
MAURICE E. TAYLOR

United States Patent Office 3,414,875
Patented Dec. 3, 1968

3,414,875
PROCESSING OF SEISMIC DATA
Edgar S. Driver, Ross Township, Allegheny County, and Maurice E. Taylor, Monroeville, Pa., assignors to Gulf Research & Development Company, Pittsburgh, Pa., a corporation of Delaware
Filed Mar. 10, 1967, Ser. No. 622,258
3 Claims. (Cl. 340—15.5)

ABSTRACT OF THE DISCLOSURE

A seismic reflection filtering system employs a postulated acoustic impedance log section which has its Fourier transform generated, the amplitude function of the transform being recorded and used as a phaseless attenuation filter which is superimposed on a similarly generated Fourier transform of the seismic reflection data. The filtered seismic data is reconstructed by generating a Fourier transform of the seismic data transform including the superimposed amplitude function of the postulated section transform, so that multiples and noise are substantially eliminated from the seismic reflection data.

Field of the invention

Figure 1:
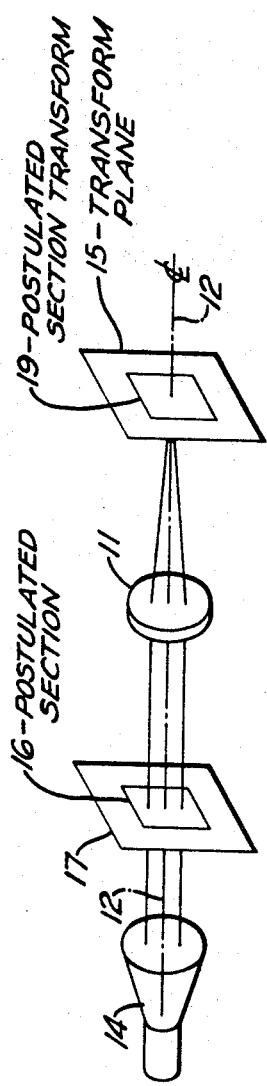

This invention relates to the data processing of seismograms and seismic reflection profiles and in particular concerns the substantial elimination of seismic multiple reflections and other unidentified noise by means of a novel type of filter employed in the processing of seismic data.

One of the problems commonly encountered in seismic reflection surveying arises because the reflected seismic signal is often masked by unwanted seismic impulses. Certain of these unwanted seismic impulses are manifestations of surface waves generated by the "shot" or other seismic source employed, and some of the unwanted impulses are due to waves that penetrate the earth but which are not sufficiently understood to be useful for geological analysis. All such unwanted seismic impulses are commonly simply called "noise" as contrasted with useful reflected energy.

It is well known that some, and in many areas a large proportion of the seismic impulses picked up by the geophone employed in a seismic reflection operation are due to multiple reflection of the initial earth tremor generated by the seismic source. Unless the seismic impulses due to multiple reflections (multiples) are recognized as such they may erroneously be interpreted as deeper reflecting horizons which do not exist. It is desirable to substantially eliminate noise and multiple reflections from seismic prospecting data in order to simplify the seismogram so that it may become more amenable to an interpretation that is correctly diagnostic of the subsurface rock configuration.

Description of the prior art

Various schemes have been proposed in the past for eliminating noise and multiple reflections from a seismogram or seismic reflection section. Examples of well-known methods are "stacking" seismograms, velocity filtering, and velocity filtering by optical occlusion in the Fourier plane. Each of these schemes has disadvantages of being slow, requiring special field setups that increase the cost of the field operations, or requiring complex and expensive data-processing apparatus. Each is further limited in that it depends on judicious selection of operation parameters by a skilled operator.

The present invention provides a method and apparatus for substantially attenuating noise and multiples that is fast and inexpensive, and that provides positive results without requiring the operator to estimate any parameters of the noise or to guess the apparent velocity of multiples to be eliminated. This invention clarifies the seismogram, or array of seismograms usually called a seismic reflection section, or seismic reflection profile, so that it will more closely represent the geological succession of subsurface horizons. Such a clarified seismogram or seismic section is uncomplicated by pseudo-horizons that are merley due to internal reflection of the initial tremor at intermediate geological horizons or by multiple reflection at the surface of the earth and which therefore do not represent depths of horizons that are actually present in the geological section. All seismic impulses picked up by the geophone and which are not due to the initial simple downgoing pulse once reflected and continuing as a simple upgoing pulse are termed "multiples." Such multiple reflections or multiples are also often included in the class of disturbances generally termed "noise" on the seismogram.

It is an object of this invention to provide a filter for substantially attenuating multiples and noise from a seismogram or seismic reflection section.

It is another object of this invention to provide a method of substantially attenuating multiples and noise from a seismogram or seismic reflection section.

It is a further object of this invention to provide a method of improving the ratio of useful reflection signal to noise on a seismogram or on a seismic reflection section.

It is a further object of this invention to provide an optical filter and method of using the filter in an optical data-processing system to substantially attenuate multiples and noise from a seismogram or seismic reflection section.

Summary of the invention

In the present invention a postulated reflecting horizon section of the area being explored is first made. The postulated reflecting horizon section is made from whatever borehole log, geological or geophysical information is available and that is applicable to the area being explored. In making the postulated reflecting horizon section the use of acoustic impedance logs is preferred but in their absence other types of logs may be employed. From the postulated reflecting horizon section its Fourier transform is generated preferably in two dimensions, and the amplitude function of the Fourier transform is recorded. A Fourier transform of the seismic data is generated correspondingly in two dimensions, the phase and amplitude functions being retained. The amplitude function of the seismic data transform is multiplied by the recorded amplitude function of the postulated reflecting horizon transform. A further Fourier transform, again correspondingly in two dimensions is taken of the product amplitude function and phase function whereby the output data is the seismic data filtered to substantially conform to the postulated reflecting horizon section. The recorded amplitude function of the postulated reflecting horizon section thus becomes an attenuation filter in a phaseless convolution process. The postulated reflecting horizon section may be modified to obtain the output picture that is most compatible with the geological and the seismic data, but in all cases the multiples and noise are substantially attenuated in the process of the invention. The process may be performed on a digital computer since computer programs for making a Fourier transform are well known. Preferably however, the making of the filter which is a record of the amplitude function of the postulated reflecting horizon section Fourier transform, and the subsequent filtering of the seismic data transform therewith, are accompilshed in an optical data-processing system.

Drawings

The objects of this invention are attained by the method and apparatus described in this specification of which the drawings form a part, and in which—

Figure 2:
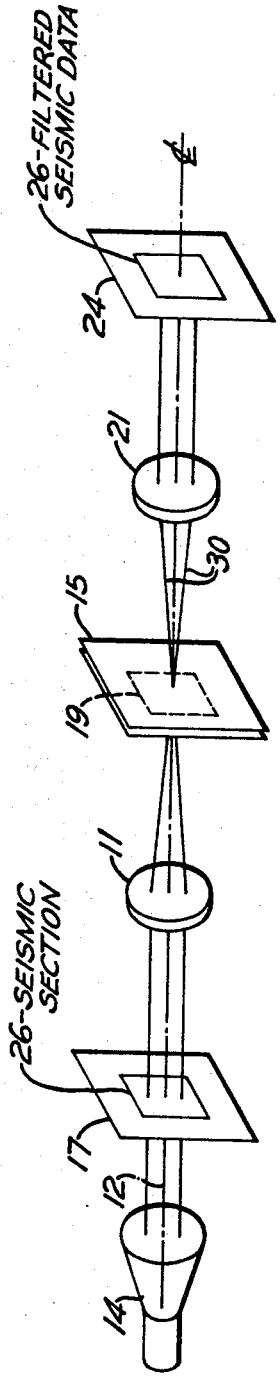

FIGURE 1 is a diagrammatical representation of one form of apparatus that may be employed in making one form of filter for use in this invention; and FIGURE 2 is a digrammatical representation of one form of optical data-processing apparatus that may be employed in this invention.

Description of the preferred embodiments

A preferred embodiment of the invention will be described as carried out in an optical data-processing system, but this is not to be considered as limiting the invention, which can alternatively be carried out by means of a digital computer as will be subsequently explained or by any other means.

According to the present invention, a postulated reflecting horizon section is first made from available data applicable to the area of interest, namely that to which the seismic reflection section pertains. The data may come from the same area as that from which the seismic reflection section was obtained, or from a nearby area, or from a more distant area whose geology is postulated as being substantially the same as that of the area of interest. Inasmuch as seismic wave reflection is dependent on the contrast of the acoustic impedances between two adjacent media, it is preferred that the data from which the postulated reflecting horizon section is to be made comprise acoustic impedance logs observed in boreholes in or near the area of interest. Because of the known relationship between reflection coefficient and the acoustic impedances of the acoustic media whose common boundary forms the reflecting surface, a reflecting horizon section and an acoustic impedance log section are substantially equivalent. Acoustic impedance is known to depend on the acoustic velocity and on the density of the respective media. For subsurface earth formations the density varies relatively little, whereas the acoustic velocity varies over a wide range. Accordingly, in the absence of observed acoustic impedance logs it is usually a sufficiently good approximation to employ acoustic velocity logs, and continuous acoustic velocity logs are commercially available.

Inasmuch as seismic reflection coefficients at subsurface boundaries are known to be a function of the acoustic impedance contrast at the boundary, it is somewhat more rigorous to employ the first derivative of an observed acoustic impedance or continuous velocity log. However, it is found that the acoustic impedance or continuous velocity log and its derivative are quite similar and are often indistinguishable from each other. Accordingly, in making the postulated reflecting horizon section the acoustic log function may be considered as equivalent to its first derivative.

Also, it is known to make a so-called synthetic reflection seismogram from a continuous velocity log by the use of a digital computer programmed to recognize only primary reflections, and the postulated reflecting horizon section may be made from such synthetic seismograms which are substantially equivalent to acoustic impedance logs. The postualted reflecting horizon section therefore comprises a postulated section based on synthetic seismograms or acoustic log data preferably from one or more boreholes in or near the area of interest.

In the event that no applicable observed acoustic logs are available, they may be inferred from other geological or geophysical data. Thus for example, if applicable electric logs are available, the corresponding acoustic log may be computed by known empirical relationships between acoustic parameters and the measured electrical parameters. Other types of logs, including radioactivity logs and drillers' logs, may be similarly empirically converted to approximate a desired acoustic log. Furthermore, in the complete absence of any applicable borehole log data, velocity contrasts may be determined from seismic refraction data in or near the area of interest. From such seismic refraction data, possibly augmented by magnetic and/or gravity data, the reflecting horizon sequence in depth and the lateral change in the sequence can be inferred to form the postulated reflecting horizon section. Usually any observed borehole logs available will not go as deep as is desired for the seismic analysis to be made since the log obviously can go no deeper than the borehole in which it was made. Accordingly, the observed log must usually be extrapolated below well depth. This can easily be done from a knowledge of the succession of older geological horizons in the area of interest and their approximate thickness as inferred by well-known geological techniques, e.g., observations on exposures of the older rocks at a nearby mountain front.

The postulated reflecting horizon section thus comprises a series of observed, computed, extrapolated, inferred and/or postulated acoustic impedance logs or their available best approximation in a side-by-side array which is postulated to simulate the sequence and attitude of the dimensional postulated representation in depth and lateral distance of the sequence and attitude of seismic reflect-geological layering in the area of interest. It is a two-ing horizons present in the area of interest and is based on the best factual data available. For example, a simple monoclinal gradation may be made from an actual log as observed in a first borehole to another actual log as observed in a second borehole located not too far away. Such a log section is made artificially by assembling a side-by-side array of logs which gradually vary from the first observed log to the second observed log, the observed logs being controls on the postulated section artificially made. Usually observed logs will be at hand for at least two locations, although more will often be available in the area of interest. The logs for intermediate locations can be made manually or computed on a digital computer and automatically drawn by a read-out device. On the other hand if but one observed log is available, the invention will still give satisfactory results for sections not too far away from the control well. In this event a flat attitude of geological horizons may be simulated by simply repeating the one log that is available in side-by-side array to obtain a simulation of a substantial area. In most instances where only a single log is available the direction of the regional dip is known and this information can be incorporated in the postulated log section to improve the degree of simulation. The postulated section is preferably made so as to have the same depth scale and the same horizontal scale as those of the seismic section to be analyzed. In the interest of brevity, the postulated reflecting horizon section or postulated acoustic impedance log section, however made, will be referred to simply as the postulated section. The postulated section is preferably made in variable-density form, but alternatively may be in variable-area form or any other form that is amenable to optical data processing.

It will be apparent that the postulated section as made, for example, from well logs, contains no data that results from multiple reflections since the log is merely a graph of acoustic impedance variations with depth in the borehole. Furthermore, the postulated section contains no extraneous disturbances such as seismic noise, since the postulated section is made from data that does not use a seismic source on the surface of the ground.

The postulated section is placed in the input plane of a two-dimensional optical data-processing system and a photosensitive medium is placed in the transform plane. The photosensitive medium is then exposed in the transform plane and a positive transparency is made of the illumination in the transform plane. If desired, a negative may first be made using a photographic emulsion on film or on a glass plate, the emulsion being properly exposed in the transform plane and developed by well-known photographic techniques. A positive transparency is then made from the negative. Alternatively, by using so-called positive film, the positive transparency may be made directly without making an intermediate negative as is well known in the photographic processing art.

Inasmuch as no multiples and noises were present in the input data (postulated section) its transform will contain no illuminated portions other than those representing primary reflecting horizons. Thus in the transparency of the postulated section transform as made in the above-described manner, those areas of the transparency that are relatively transparent (i.e., have high transmission) will allow the light representing primary reflections to pass through, whereas all other areas of the transparency will be relatively dark (i.e., will have low transmission) and will absorb light. Accordingly, the positive transparency so made will pass solely such light as forms the spectrum of the postulated section used in making the positive transparency and which section contains no multiples and no noise.

The two-dimensional Fourier transform of the postulated section is known to comprise two characteristic functional components (which, however, are not to be confused with the two-dimensional variation of each component); namely, a phase function and an amplitude function. Thus, the light at each point in the transform plane is characterized by a phase and an amplitude. Inasmuch as the photosensitive medium placed in the transform plane is responsive only to the intensity of light striking its emulsion, the resulting transparency is a record only of the amplitude function of the light distribution (two-dimensional) in the transform of the postulated section. When the transparency of the postulated section transform is subsequently employed as a filter in a manner to be explained, the transparency correspondingly can only attenuate the intensity of transmitted light and the transparency is essentially a phaseless attenuation filter. It will be apparent that the filter (transparency of the amplitude function of the postulated section transform) will have areas that have high transmission, and areas that have low transmission, and areas of various intermediate gradation, so that various parts of the filter will attenuate light traversing it in various degrees, i.e., the transparency is a two-dimensional phaseless attenuation filter.

The postulated section is now removed from the input plane of the optical data-processing system and the seismic reflection profile to be analyzed is put into the input plane to obtain a second transform. The seismic profile is preferably in the same form as the previously made postulated section, i.e., in variable-density form, but may be in any form that is amenable to optical data processing. The same optical data-processing system is preferably used so that the (second) transform of the seismic reflection profile will fall in substantially the same position as the previously formed (first) transform of the postulated section. The previously made transparency of the amplitude function of the postulated section transform is placed at the transform plane in registry with the seismic section transform thus forming a transform-plane attenuation filter. The filter, having low transmission except at those parts of the transform which represent primary effects of horizons present on the postulated section, will substantially attenuate all noise and all multiple reflections from the seismic data transform. The remaining illumination distribution which traverses the transform plane will at each point be the mathematical product of the transmission of the postulated section transform transparency and the illumination that constitutes the amplitude function of the seismic data transform itself at that point. The process is therefore a phaseless filtering of the seismic data with the postulated section.

A further Fourier transform of the resuting illumination distribution is then made. This recovers the seismic data except for such components, i.e., noise and multiples which are attenuated by the postluated section transform filter. Accordingly, the output data is substantially free of noise and multiples, and represents those impulses of the seismic data that conform to the postluated section. The postulated section may be varied slightly to that which results in the geologically most reasonable output picture and a geological interpretation may then be made substantially free of interference by noise and multiples.

A preferred form of apparatus that may be employed in this invention will now be described with reference to the accompanying drawing.

Referring to FIGURE 1, there is shown an optical data-processing system comprising spherical lens 11 centered on an optic axis 12 and arranged to have an object or input plané 17 that is illuminated by a source 14 of monochromatic light in conventional manner. The source 14 may comprise a laser and beam spreader as is well known. Inasmuch as the spherical lens 11 is nonanamorphic it will generate a two-dimensional Fourier transform at its Fourier plane 15. In such optical data-processing systems it is customary that the lens 11 be placed a distance equal to its focal length from the input plane 17 and that the Fourier plane be a distance equal to the focal length of the lens behind the lens 11. The optical system is provided with a conventional photographic shutter (not shown) and housed in a dark room or box (not shown) in conventional manner.

The postulated section 16, artificially made as described above, is placed in the input plane 17 of the apparatus of FIGURE 1. A photosensitive medium, as for example Eastman Kodak Company film type 649F, which is a spectroscopic film having high density and wide dynamic range, is placed in the transform plane 15 of the telescopic system and a photographic exposure made after which the film is developed in conventional manner. Subsequently, a positive transparency is made therefrom. Conveniently, the photosensitive medium may be a so-called positive type of photographic film that is sensitive to the monochromatic light of source 14, so that upon proper photographic exposure and development of the film there is directly obtained a positive transparency 19 of the illumination distribution in the transform plane 15 of the light from the postulated section 16. Inasmuch as the postulated section 16 contains no horizons which represent the pseudo-horizons caused by multiple seismic reflections, the postulated section transform transparency 19 obtained from FIGURES 1 will be substantially free of spectral components representing multiples. Similarly, no noise will be represented in the postulated section transform transparency 19 obtained from FIGURE 1.

The transform transparency 19 should be made on exceptionally fine-grained photographic film or preferably made with photochromic dye so as to be grain-free. One way of making this transparency is by using commercial positive color film such as that commonly employed in making ordinary color transparencies, i.e., color slides, which film is substantially free of graininess. The resulting transparency will show color (i.e., transmit light) corresponding to light from source 14 at the illuminated portions of the spectrum forming the transform, and will attenuate light to various degrees elsewhere. Accordingly, the transform transparency 19 transmits such light as arises in the transform plane 15 because of the primary reflecting horizons present in the postulated section 16. As previously indicated, the transform transparency 19 is subsequently employed as a two-dimensional phaseless attenuation filter in an optical data-processing system in order to substantially remove from the seismic section transform such components as are not due to primary reflecting horizons, i.e., to attenuate components due to multiplies and noise.

Referring now to FIGURE 2, the optical data-processing apparatus comprises the apparatus of FIGURE 1 plus an additional spherical lens 21 that is employed to generate a further two-dimensional Fourier transform in the output data plane 24. The telescopic system comprising lenses 11 and 21 uses input plane 17 and produces an output image in the output plane 24, while also generating at the intermediate transform plane 19 a Fourier transform of the input data in well-known manner. The lenses 11 and 21 are shown diagrammatically in FIGURE 2 for purposes of illustration since such lenses are well known. Lenses 11 and 21 may each represent one lens or a system of lenses, as will appear more clearly below. It is preferred that the initial (left-hand) part of the lens system of FIGURE 2 be the same as the lens system of FIGURE 1 in order to avoid scale changes and to insure registry. In the event that the initial (left-hand) part of the lens system of FIGURE 2 differs from that of FIGURE 1 the respective (left-hand) lenses must be adjusted to give the same horizontal scale and the same vertical scale at the transform plane 15 in each case. The lens system to the right of plane 15 of FIGURE 2 as represented by lens 21 may be different from lens 11 in order to obtain any desired scale change in the output data as is well understood.

The seismic data 26 to be processed is placed in input plane 17 and a two-dimensional Fourier transform of the seismic data is generated in plane 15 of FIGURE 2. It is preferred that the seismic input data 26 be to the same scale as the postulated section 16 previously employed in FIGURE 1 in order that the transform in plane 15 of FIGURE 2 be to the same scale as the transform previously photographed in FIGURE 1, accordingly it is convenient though not essential that the sections 16 and 26 be made to the same scale and that the same lens system 11 be employed in FIGURES 1 and 2. It will be apparent, however, that if the postulated section 16 and the seismic data 26 are made to different scales, it is possible to produce transforms of the same scale by employing an appropriately different lens system 11 in each case so as to generate geometrically congruent transforms at the plane 15 of FIGURE 2.

The previously made postulated transform transparency 19 is now put in the transform plane 15 of FIGURE 2, being superimposed in registry with the seismic transform in plane 15. The light 30 that traverses the transform plane 15 and the postulated transform transparency 19 will contain substantially only transform components of primary reflections, because the postulated transform transparency 19 attenuates all transform components except those due to primary reflections from a seismic section that fits the previously made postulated section 16. The postulated transform transparency 19 thus functions as an absorption filter that more strongly attenuates those transform components that are due to multiples and noise than those transform components from reflecting horizons in the postulated section. The second lens 21 generates at output plane 24 a two-dimensional Fourier transform of the illumination that traverses the plane 15, such light being modulated in intensity by the postulated transform transparency 19. Since a transform of a transform recovers the original data, the seismic data is reconstituted in filtered form at the output plane 24. Accordingly, the output seismic data as reconstituted in plane 24 by the telescopic system of FIGURE 2 will contain substantially no multiple reflections and substantially no noise due to filtering action of the postulated transform transparency 19. Thus, the output seismic profile obtained in plane 24 is substantially free of multiples and substantially free of noise. The output data may be photographed in plane 24 or otherwise observed in conventional manner for further study.

It will be apparent that the postulated transform transparency 19 is an optical filter that in the transform plane passes components due to primary reflections and attenuates components of other seismic events such as multiples and noise. (Of course, any noise or multiple event that has a spectral component which accidentally happens to coincide with that of a primary reflection will also be transmitted, but such a situation is relatively rare.) Furthermore, the primary reflections whose spectral components are passed must fit the postulated section 16 whose transform is employed as the filter in FIGURE 2. This may in some instances result in too severely sharp filtering which may result in loss of some primary reflections. In order to broaden the filtering effect of the postulated transform transparency 19 the transparency may be made slightly fuzzy. Care must be taken in introducing fuzziness to preserve the overall scale. Thus the fuzziness may be introduced in FIGURE 1 by making the transparency 19 at a slightly out-of-focus plane close to the transform plane 15, with concomitant shifting of the lens or object positions to correct the geometry to avoid a scale change. Alternatively, in making the postulated transform transparency 19 the original postulated section 16 may be moved slightly during the photographic exposure. By this means various unknown parameters in the postulated section can be broadened. For example, the postulated section 16 may be oscillated vertically during the photographic exposure in order to broaden the horizons in a vertical direction, or the postulated section 16 may be rotated about the optic axis 12 or some other axis parallel thereto, during the photographic exposure (FIGURE 1) in order to broaden the postulated angle of dip of the horizons. Conventional mechanical means (not shown) may be combined with the mounting means for the postulated section 16 to effect the desired movement during the photographic exposure time of making the transparency 19. Alternatively, a sharp postulated transform transparency 19 may be effectively made fuzzy by appropriately oscillating it when placed in the transform plane 15 during the filtering step of FIGURE 2. The latter method has the advantage that the operator can adjust the direction and degree of fuzziness, i.e., the orientation and the sharpness of filtering, by varying the direction and amplitude of oscillation in translation and/or rotation while viewing its effect in the output plane 24. It will, of course, be apparent that all of the above-mentioned motions are relative motions between any elements of the optical system of FIGURE 1 or FIGURE 2 effective in forming the transform.

Whereas the above-described preferred embodiment of the invention comprises the use of optical data-processing apparatus, the invention can with equal facility be practiced on a digital computer. In the digital embodiment of the invention, the postulated section is made and digitized in conventional manner. Digital computing programs for generating a Fourier transform are well known. The amplitude function of the generated digital transform of the digitized postulated section is obtained and stored in the computer. The seismic section is then also digitized in conventional manner and its Fourier transform is generated by means of the same computer program. The seismic section transform will have a phase function and an amplitude function. The amplitude function of the seismic section transform is then multiplied by the stored amplitude function of the postulated section transform, whereby the stored transform acts as a filter for the seismic data. The same computer program is then employed a third time on the combined product of the amplitude functions and the seismic transform phase function. Since a Fourier transform of a Fourier transform reconstitutes the original data, the recovered computer output is plotted as the seismic section with multiples and noise attenuated. Thus, the invention can be carried out digitally if desired. However, the digital computations are lengthy and take considerable expensive computer time, and therefore the above-described optical embodiment of the invention is preferred. However, the digital embodiment of the invention has the advantage of greater dynamic range.

It will be apparent that a combination of optical and digital processing systems may be employed. For example, the (first) postulated section transform 19 may be generated optically by the use of the apparatus of FIGURE 1, and observed by means of a television pickup tube having externally controlled scan. The seismic data transform may be digitally computed and by controlling the television pickup tube scan in synchronism with the digital computation of the (second) transform, the necessary step of multiplying the amplitude functions of the first and second transforms can be accomplished concomitantly with the digital computation, thereby circumventing the necessity of storing one transform in the computer memory.

It is further possible to attain the same mathematical result as the above-mentioned hybrid process by generating the (first) postulated section transformoptically by the use of the apparatus of FIGURE 1 and photographing the first transform as a transparency 19 in the manner previously described, thus recording the first amplitude function. Alternatively of course the first amplitude function may be digitally computed. A second Fourier transform is then generated of the first amplitude function by means of digital computation. This second transform is a transform of the postulated section phaseless transform and is a function of the postulated section. This function is then convolved digitally with the digitized original seismic section 26. Computer programs for such a convolution operation are well known. Such a process is a phaseless convolution filtering operation which filters the seismic data in a unique manner to conform to the postulated section.

In the foregoing description the invention is applied to a case in which it is desired to process a two-dimensional seismic profile and accordingly, a two-dimensional postulated section is employed and the process of the invention is carried out using a two-dimensional data-processing system which may be either optical or digital. However, it will be apparent that the invention may similarly be employed to process a single seismogram in which case a single postulated acoustic impedance log is employed and the respective Fourier transforms are one-dimensional, the active dimension being vertical depth or its functional equivalent, time. In such case the optical data-processing system comprises an anamorphic telescopic system whose axis of anamorphism is parallel to the depth direction of the postulated log and the seismogram, such anamorphic optical data-processing systems being well known in the art.

It will also be apparent to those skilled in the art of optical data processing that this invention may be carried out concomitantly with other optical data-processing operations, as, for example, frequency filtering, velocity filtering, directional filtering, or spectrum whitening.

What we claim as our invention is:

1. The method of attenuating multiples and noise from a seismic reflection section which comprises preparing a postulated reflecting horizon section of approximately the same geological region as that to which the seismic reflection section pertains, optically generating a first Fourier transform of said postulated section, photographing said first Fourier transform in the form of a transparency whereby the amplitude function of said first transform is recorded, optically generating a second Fourier transform of the seismic reflection section, said second Fourier transform having the same horizontal and vertical scales as those of said first Fourier transform, superimposing said transparency on said second Fourier transform in registry therewith, optically generating a third Fourier transform of said superimposed transparency and said second Fourier transform, whereby the seismic reflection section is recovered with multiples and noise substantially attenuated, and wherein said transparency is oscillated while superimposed on said second Fourier transform.

2. The method of attenuating multiples and noise from a seismic reflection section which comprises preparing a postulated reflecting horizon section of approximately the same geological region as that to which the seismic reflection section pertains, optically generating a first Fourier transform of said postulated section, photographing said first Fourier transform in the form of a transparency whereby the amplitude function of said first transform is recorded, optically generating a second Fourier transform of the seismic reflection section, said second Fourier transform having the same horizontal and vertical scales as those of said first Fourier transform, superimposing said transparency on said second Fourier transform in registry therewith, optically generating a third Fourier transform of said superimposed transparency and said second Fourier transform, whereby the seismic reflection section is recovered with multiples and noise substantially attenuated, and wherein said first Fourier transform is photographed out of focus.

3. The method of attenuating multiples and noise from a seismic reflection section which comprises preparing a postulated reflecting horizon section of approximately the same geological region as that to which the seismic reflection section pertains, optically generating a first Fourier transform of said postulated section, photographing said first Fourier transform in the form of a transparency whereby the amplitude function of said first transform is recorded, optically generating a second Fourier transform of the seismic reflection section, said second Fourier transform having the same horizontal and vertical scales as those of said first Fourier transform, superimposing said transparency on said second Fourier transform in registry therewith, optically generating a third Fourier transfom of said superimposed transparency and said second Fourier transform, whereby the seismic reflection section is recovered with multiples and noise substantially attenuated, and wherein said postulated section is moved during the step of photographing said first Fourier transform.

References Cited

UNITED STATES PATENTS

| | | | |
|---|---|---|---|
| 2,794,965 | 6/1957 | Yost | 340—15.5 |
| 3,240,108 | 3/1966 | Lehan et al. | 88—1 2/1961 |

OTHER REFERENCES

Cutrona: Ch. 6, "Optical and Electro-Optical Information Processing," M.I.T. Press, 1965, pp. 85–88.

Dobrin et al.: Velocity and Frequency Filtering of Seismic Data Using Laser Light, Conductron Corp., Aug. 25, 1965, pp. 28, 29.

RODNEY D. BENNETT, *Primary Examiner.*

C. E. WANDS, *Assistant Examiner.*

UNITED STATES PATENT OFFICE
CERTIFICATE OF CORRECTION

Patent No. 3,414,875                                   December 3, 1968

Edgar S. Driver et al.

It is certified that error appears in the above identified patent and that said Letters Patent are hereby corrected as shown below:

Column 4, line 23, beginning with "dimensional" cancel all to and including "is based on" same column 4, line 26, and insert -- geological layering in the area of interest. It is a two-dimensional postulated representation in depth and lateral distance of the sequence and attitude of seismic reflecting horizons present in the area of interest and is based on --.

Signed and sealed this 10th day of March 1970.

(SEAL)
Attest:

Edward M. Fletcher, Jr.                          WILLIAM E. SCHUYLER, JR.

Attesting Officer                                        Commissioner of Patents